US009288636B2

(12) United States Patent
McClendon (10) Patent No.: US 9,288,636 B2
(45) Date of Patent: Mar. 15, 2016

(54) FEATURE SELECTION FOR IMAGE BASED LOCATION DETERMINATION

(71) Applicant: Google Inc., Mountain View, CA (US)

(72) Inventor: Brian McClendon, Portola Valley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/075,621

(22) Filed: Nov. 8, 2013

(65) Prior Publication Data

US 2015/0134690 A1 May 14, 2015

(51) Int. Cl.
*G06F 17/30* (2006.01)
*H04W 4/04* (2009.01)
*G06K 9/00* (2006.01)

(52) U.S. Cl.
CPC ......... *H04W 4/043* (2013.01); *G06F 17/30241* (2013.01); *G06F 17/30247* (2013.01); *G06K 9/00664* (2013.01)

(58) Field of Classification Search
USPC .......................................... 707/758; 382/103
See application file for complete search history.

(56) References Cited

U.S. PATENT DOCUMENTS

| | | | |
|---|---|---|---|
| 2001/0056415 A1 | 12/2001 | Zhu et al. | |
| 2007/0127822 A1* | 6/2007 | Boose | 382/218 |
| 2009/0119590 A1* | 5/2009 | Kondziela et al. | 715/716 |
| 2009/0245630 A1 | 10/2009 | Johnston | |
| 2010/0241650 A1 | 9/2010 | Chittar | |
| 2011/0087666 A1* | 4/2011 | Chou et al. | 707/737 |
| 2012/0076423 A1* | 3/2012 | Tang et al. | 382/203 |
| 2012/0158705 A1* | 6/2012 | Konig et al. | 707/723 |
| 2013/0141565 A1* | 6/2013 | Ling | 348/135 |
| 2013/0332482 A1* | 12/2013 | Son et al. | 707/769 |

OTHER PUBLICATIONS

"Google Goggles" [online], <https://play.google.com/store/apps/details?id=com.google.android.apps.unveil&hl=en>, Oct. 29, 2013, 2 pages.
"Metropolitan Museum Enhances Online Access to Its Collections with Google Goggles", [online], retrieved from internet Nov. 5, 2013, <www.metmuseum.org/about-the-museum/press-room/news/2011/google-goggles>, 3 pages.
"New System Estimates Geographic Location of Photos", [online], retrieved Nov. 5, 2013, <phys.org/news133004080.html>, 7 pages.
"Open your eyes: Google Goggles now available on iPhone in Google Mobile App—Official Google Mobile Blog", [online], retrieved Nov. 5, 2013, <googlemobile.blogspot.com/2010/10/open-your-eyes-goggles-now.html>, 6 pages.
"Structure from Motion" [online], retrieved Nov. 5, 2013, <en.wikipedia.org/wiki/Structure_from_motion>, 4 pages.

(Continued)

*Primary Examiner* — Amresh Singh
(74) *Attorney, Agent, or Firm* — Lerner, David, Littenberg, Krumholz & Mentlik, LLP (57) ABSTRACT

Feature selection is provided for geometry data in an image-based based location determination. For example, one or more computing devices may receive information collected for a particular area. The one or more computing devices may identify one or more features and associated location from the received information. Given ones of the identified one or more features are selected based on a characteristic of a user. The selected ones of the one or more features and the associated locations are used to generate a set of geometry data for the particular area.

15 Claims, 11 Drawing Sheets

(56) References Cited

OTHER PUBLICATIONS

Amir Roshan Zamir and Mubarak Shah, Accurate Image Localization Based on Google Maps Street View, 2010, 14 pages.
Biliana Kaneva, Josef Sivic, Antonio Torralba, Shai Avidan and William T. Freeman, Matching and Predicting Street Level Images, 2010, 14 pages.
Frode Eika Sandnes, Determining the Geographical Location of Image Scenes Based on Object Shadow Lengths, Jun. 20, 2010, 13 pages.
Tony Jebara, Ali Azarbayejani and Alex Pentland, 3D Structure from 2D Motion, 1999, 17 pages.
Victor J.D. Tsai and Chun-Ting Chang, Feature Positioning on Google Street View Panoramas, ISPRS Annals of the Photogrammetry, Remote Sensing and Spatial Information Sciences, vol. 1-4, 2012, 5 pages.
Yunpeng Li, Noah Snavely and Daniel P. Huttenlocher, Location Recognition using Prioritized Feature Matching, 2010, 14 pages.
"Visual Navigation Lecture", Jun. 4, 2013, XP055169822, Retrieved from the Internet: <https://www.youtube.com/watch?v=HuzC0MAlo0w&index=6&list=PLTBdjv_4f-EKeki5ps2WHqJqyQvx1s4ha>, [retrieved on Feb. 16, 2015] the whole document.
International Search Report for Application No. PCT/US2014/063399 dated Feb. 24, 2015.
Kunihiro Nishimura: "Estimation of Camera Position without Markers for both Indoor and Outdoor Environments", Sep. 22, 2011, XP055169821, Retrieved from the Internet: <https://www.youtube.com/watch?v=1E_dw_MqTms>, [retrieved on Feb. 16, 2015] the whole document.
Navvis: "Visual Indoor Navigation: Vision-based Localization for Smartphones", Oct. 24, 2012, XP055169818, Retrieved from the Internet: <https://www.youtube.com/watch?v=w6gMqJPnlso>, [retrieved on Feb. 16, 2015] the whole document.
Robert Huitl et al: "Virtual reference view generation for CBIR-based visual estimation", Proceedings of the 20th ACM International Conference on Multimedia, MM '12, Oct. 29, 2012, p. 993, XP055169804.

\* cited by examiner

FEATURE SELECTION FOR IMAGE BASED LOCATION DETERMINATION

CROSS-REFERENCE TO RELATED APPLICATIONS

This application is related to co-pending U.S. patent application Ser. No. 14/075,565, entitled "IMAGE BASED LOCATION DETERMINATION," filed concurrently herewith, the entire disclosure of which is incorporated herein by reference.

BACKGROUND

Various mobile devices can provide information about their current location. For example, a typical mobile computing device such as a cellular phone or tablet computer may use wireless network access point models, geographic position systems, or various triangulation methods to determine their locations. However, these methods may not be available in certain locations where network coverage or satellite information is unavailable.

SUMMARY

Aspects of the disclosure provide computer-implemented method. The method includes receiving, by one or more computing devices, information collected at an particular area; identifying, by the one or more computing devices, one or more features and associated locations from the received information; selecting, by the one or more computing devices, given ones of the identified one or more features based on a characteristic of a user; and generating, by the one or more computing devices, a set of geometry data for the particular area based on the selected ones of the one or more features and the associated locations.

In one example, the characteristic includes locations where that user is likely to be at the particular area. In another example, the characteristic includes locations where that user is not likely to be at the particular area. In another example, the characteristic includes locations where that user is likely to be lost at the particular area. In another example, the characteristic includes a type of the user. In another example, the characteristic includes an activity associated with the user. In another example, the characteristic includes a storage attribute of a mobile computing device of the user. In another example, the characteristic includes a processing power attribute of a mobile computing device of the user.

Another aspect of the disclosure provides a system. The system includes one or more computing devices. The one or more computing devices are configured to receive information collected at an particular area; identify one or more features and associated locations from the received information; select given ones of the identified one or more features based on a characteristic of a user; and generate a set of geometry data for the particular area based on the selected ones of the one or more features and the associated locations.

In one example, the characteristic includes locations where that user is likely to be at the particular area. In another example, the characteristic includes locations where that user is not likely to be at the particular area. In another example, the characteristic includes locations where that user is likely to be lost at the particular area. In another example, the characteristic includes a type of the user. In another example, the characteristic includes an activity associated with the user. In another example, the characteristic includes a storage attribute of a mobile computing device of the user. In another example, the characteristic includes a processing power attribute of a mobile computing device of the user.

A further aspect of the disclosure provides a non-transitory, computer-readable storage device on which computer readable instructions of a program are stored. The instructions, when executed by one or more processors, cause the one or more processors to perform a method. The method includes receiving information collected at an particular area; identifying one or more features and associated locations from the received information; selecting given ones of the identified one or more features based on a characteristic of a user; and generating a set of geometry data for the particular area based on the selected ones of the one or more features and the associated locations.

In one example, the characteristic includes an activity associated with the user. In another example, the characteristic includes a storage attribute of a mobile computing device of the user. In another example, the characteristic includes a processing power attribute of a mobile computing device of the user.

Yet another aspect of the disclosure provides a computer-implemented method. The method includes receiving, by one or more computing devices, information collected at a particular area; identifying, by the one or more computing devices, one or more features and associated locations from the received information; ranking, by the one or more computing devices, the identified one or more features according to relative uniqueness among the identified one or more features; and generating, by the one or more computing devices, a set of geometry data for locating a mobile device at the particular area based on selected ones of the ranked features and the associated locations.

In on example, the set of geometry data is generated further based on a threshold ranking percentile. In another example, the set of geometry data is generated further based on a number of directions a camera of a mobile computing device is likely to be pointed in from a given location at the particular area. In another example, the set of geometry data is generated such that the set of geometry data does not include duplicate features. In another example, the set of geometry data is generated further based on a size of the set of geometry data when the geometry data is compressed. In another example, the set of geometry data is generated further based on expected locations of people at the particular area. In another example, sending the set of geometry data to a client computing device. In another example, the particular area is an indoor space.

Another aspect of the disclosure provides a system. The system includes one or more computing devices. The one or more computing devices are configured to receive information collected at a particular area; identify, by the one or more computing devices, one or more features and associated locations from the received information; rank the identified one or more features according to relative uniqueness among the identified one or more features; and generate a set of geometry data for locating a mobile device at the particular area based on selected ones of the ranked features and the associated locations.

In one example, the one or more computing devices are further configured to generate the set of geometry data further based on a threshold ranking percentile. In another example, the one or more computing devices are further configured to generate the set of geometry data further based on a number of directions a camera of a mobile computing device is likely to be pointed in from a given location at the particular area. In another example, the one or more computing devices are further configured to generate the set of geometry data such that the set of geometry data does not include duplicate features. In another example, the one or more computing devices are further configured to generate the set of geometry data further based on a size of the set of geometry data when the geometry data is compressed. In another example, the one or more computing devices are further configured to generate the set of geometry data further based on expected locations of people at the particular area. In another example, the one or more computing devices are further configured to send the set of geometry data to a client computing device. In another example, the particular area is an indoor space.

A further aspect of the disclosure provides a non-transitory, computer-readable storage device on which computer readable instructions of a program are stored. The instructions, when executed by one or more processors, cause the one or more processors to perform a method. The method includes receiving information collected at a particular area; identifying one or more features and associated locations from the received information; ranking the identified one or more features according to relative uniqueness among the identified one or more features; and generating a set of geometry data for locating a mobile device at the particular area based on selected ones of the ranked features and the associated locations.

In one example, the set of geometry data is generated further based on a threshold ranking percentile. In another example, the set of geometry data is generated further based on a size of the set of geometry data when the geometry data is compressed. In another example, the set of geometry data is generated further based on expected locations of people at the particular area.

DETAILED DESCRIPTION

Overview

The technology discussed herein relates to having a mobile computing device determine its location from a camera image without relying on information from the camera or the mobile computing device other than the image itself. For example, when using a mobile computing device such as a cellular phone, in many situations, geographic positioning systems such as the Global Positioning System (GPS), or local network access (e.g., WiFi) may not be available. As an example, these may not be available in certain indoor spaces or remote locations, such as mountain ranges. If the user wants to determine where he or she is, the mobile computing device may do so by using an image of the location and comparing that image to pre-stored geometry of the indoor space. Thus, even though other geographic location systems are unavailable, the mobile computing device may provide the user with location information. Further, even if geographic location systems are available, the user's mobile device may not have a compatible module for determining location. Or the geographic location module on the mobile device, if there is one, may be turned off or otherwise unavailable.

In one aspect, while moving through an area such as a building or an outdoor space, the user may want to know where here or she is currently located. For example, the user may launch an application or other feature of a client computing device in order to determine the current location of the client computing device. In response, the mobile computing device may prompt the user to move the mobile computing device around the indoor space to capture a video or a series of images of the indoor space. Alternatively, the user may simply capture an image of the indoor space.

The mobile computing device may access geometry data describing the geometry of the world proximate to the mobile computing device. This data may be pre-stored on the mobile computing device or retrieved from a server. For example, when a user enters a building, the mobile computing device may request the geometry information for the building at that time using a last known global positioning system fix, barcode, address information, etc.

The mobile computing device may then compare the camera image to the geometry data to identify the mobile computing device's location and orientation without any other information from the camera or other location cues (e.g. GPS, WiFi, etc.). Once the location has been determined, it may be displayed to the user.

In some embodiments, in order to determine the device's location, the mobile computing device may extract features from the obtained image and compare those features to the geometry data. The features may be extracted on the mobile computing device and/or the image may be sent to one or more other computing devices in order to extract the features.

In some examples, if the mobile computing device is unable to make a location determination, it may prompt the user for assistance. As an example, the mobile computing device may ask the user to pan around the room or take another picture. The mobile computing device may also ask the user to take a picture of a unique or interesting object in that room.

In order to provide the mobile computing device with the geometry data, information about the geometry of a location must first be captured. In some examples, the interior of a building may be captured using lasers, sonar, and/or cameras. This data may then be processed to identify the various features of the location as well as their relative locations.

The identified features may then be reviewed to determine what geometry (or features) are needed for localization. For example, there is a tradeoff between the size of an area that can be covered by particular package of geometry data and the amount of data that can be compressed or packaged in a way that it can be used by a mobile computing device. Thus, features may be included or excluded from the geometry data of a particular area based on the number of directions a camera of a mobile computing device is likely to be pointed in from any given location, as well as the features themselves. In addition, certain features, or geometry data of those features, may be excluded if it would not be helpful in identifying the location. Similarly, features which are unique to an area should be (e.g., unique geometric shapes or arrangements of colors) included as they would be helpful to the localization.

In one example, features and feature geometry may be ranked by uniqueness. For example, in an office building, chair and desk arrangements may be less unique than the location, size, and/or type of wall hangings. Similarly, in the case of an outdoor situation the geometry and features of a set of identical buildings may be less unique, but the same building standing alone in another location may be very unique.

The highest-ranking features and feature geometry may then be selected for the geometry data that will be used by the mobile computing devices to determine location. In this regard, low ranking features (or those that are less unique) may be excluded from the geometry data used by the mobile computing device.

The geometry data may also be filtered or otherwise compressed (or ranked as described above) with regard to users in general or specific to a particular user or that user's mobile computing device. Thus, features and feature geometry may be excluded or included based on whether the geometry data corresponds to locations where users are likely to be or where users are likely to get lost. Geometry data may also be filtered based on the type of user who will need to be located. For example, if a user is a tourist, geometry related to signs or the shape of buildings may be more important, whereas if the user is an athlete (e.g., a runner), geometry data related to roads, paths, or vegetation (e.g., trees) may be more important. In another example, the geometry data may be determined based on the limitations of the user's mobile computing device such as bandwidth, storage, processing power, etc.

Example Systems

Figure 1:
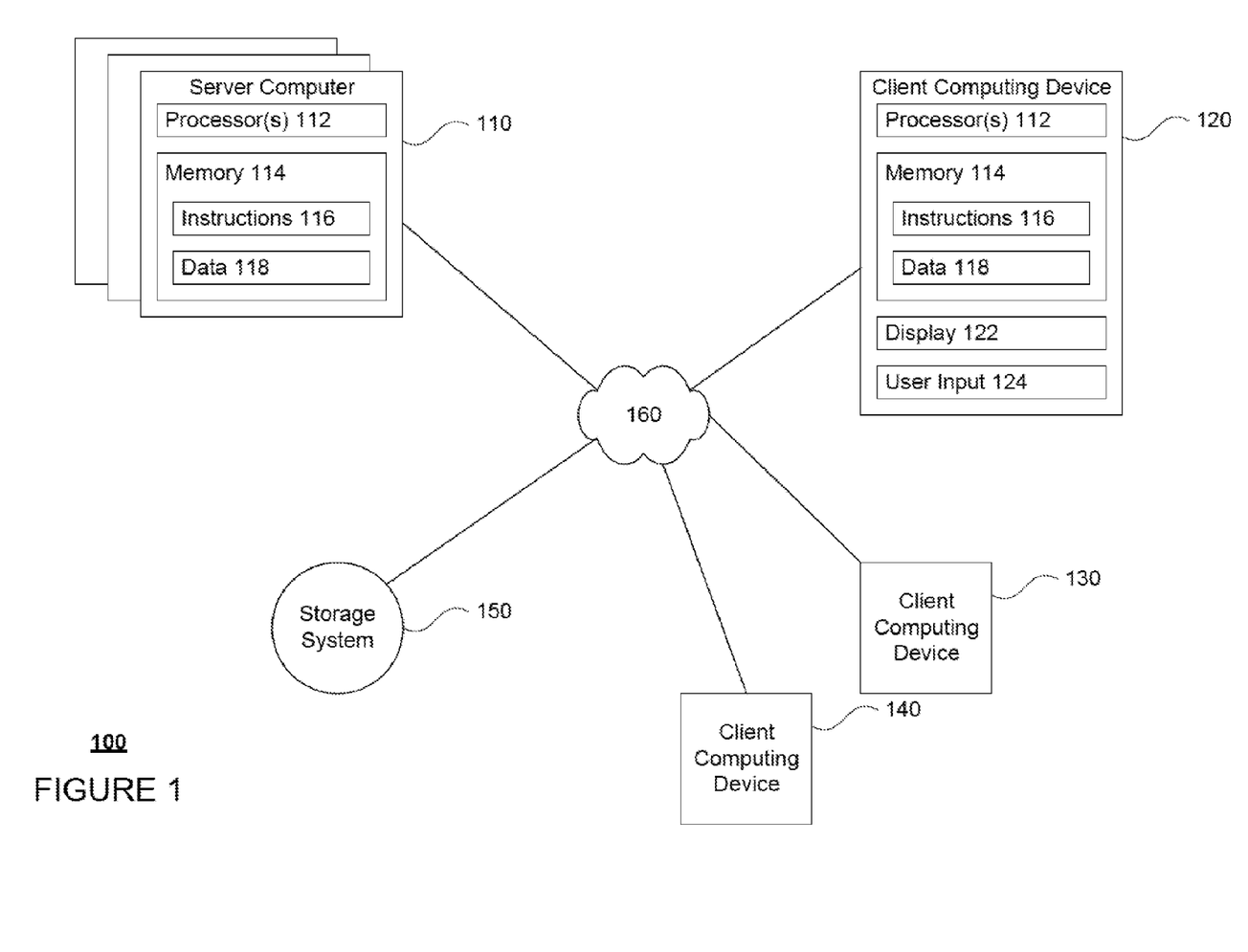
FIG. 1 is a functional diagram of an example system in accordance with aspects of the disclosure.
Figure 2:
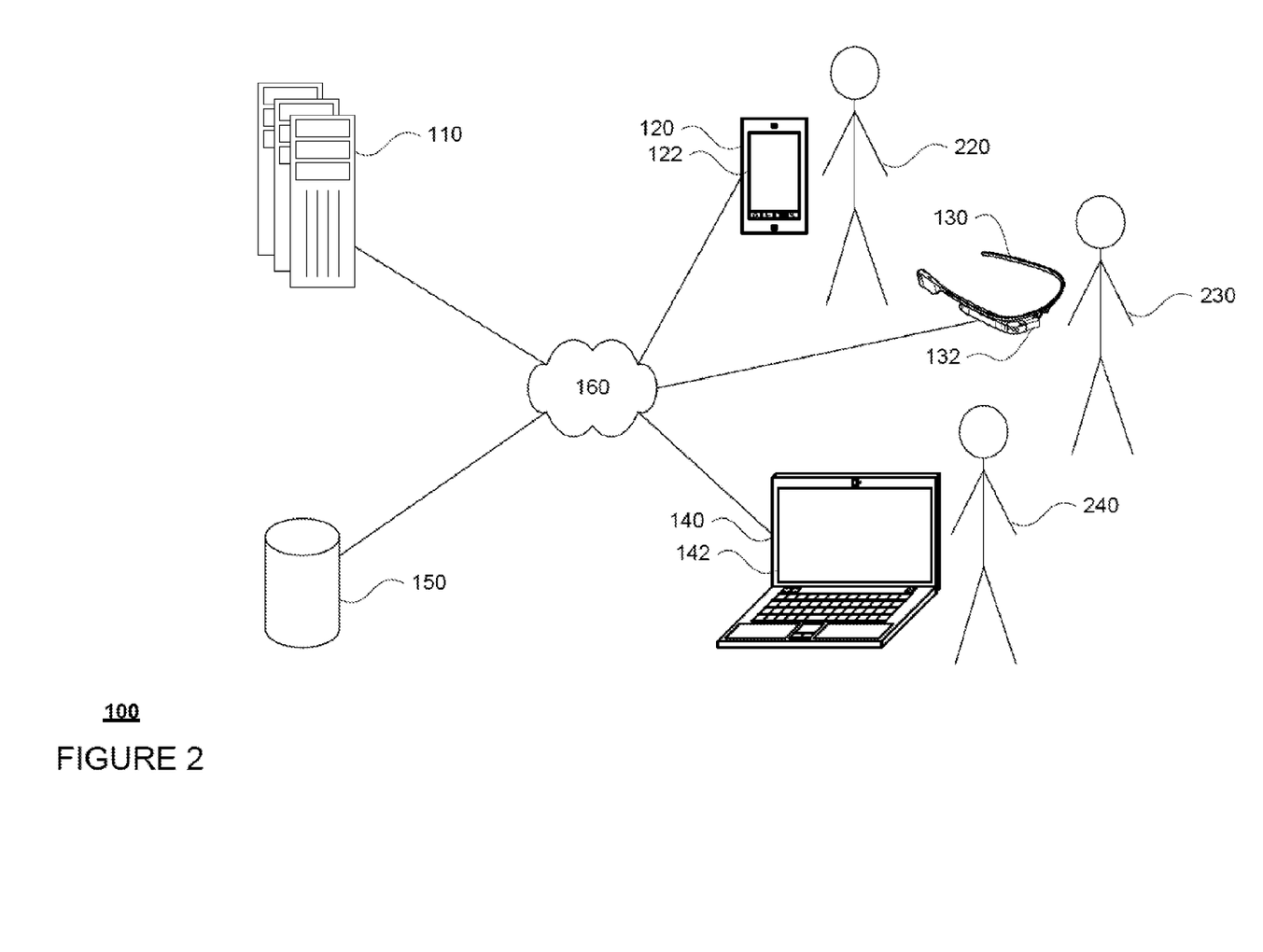
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Each computing device 110 can contain one or more processors 112, memory 114 and other components typically present in general purpose computing devices. Memory 114 of each of computing devices 110, 120, 130, and 140 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 118 can be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices 110 can be at different nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described herein.

Each of the client computing devices 120, 130, and 140 may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

Figure 3:
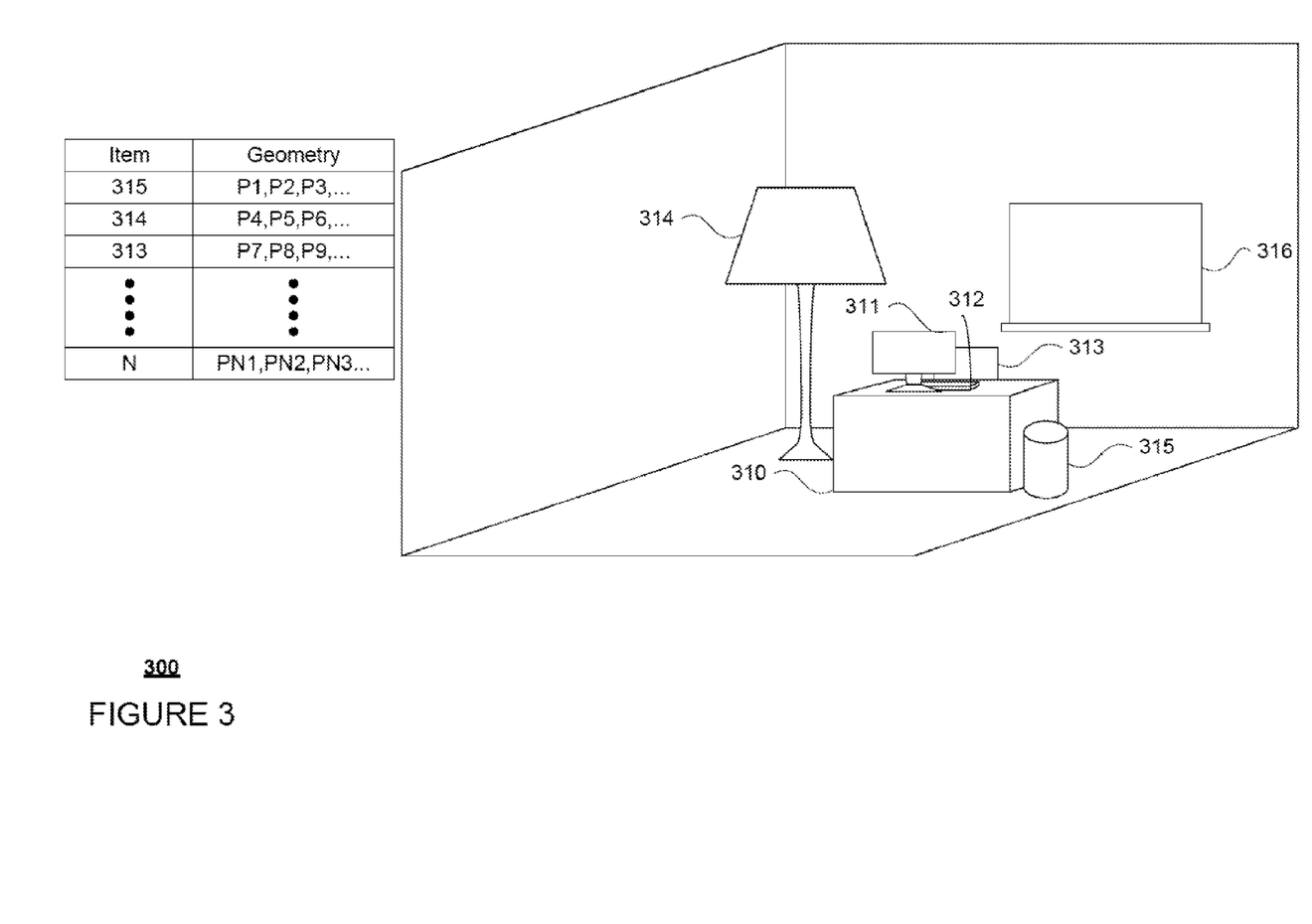
FIG. 3 is an example of geometry data and a representation of geometry data in accordance with aspects of the disclosure.

Storage system 150 may store geometry data. The geometry data may be predetermined for different areas, users, client computing devices, etc. as described below. The geometry data may include a plurality of three dimensional points or vectors defining the geographic locations of features as well as other information such as color or colors, feature type (chair, window, etc.), textures, etc. FIG. 3 is an example 300 of a table of geometry data and a three-dimensional representation of that geometry data. In this example, the geometry data corresponds to a room and includes information identify the shape and location of various items or features including desk 310, computer monitor 311, keyboard 312, chair 313, lamp 314, garbage can 315, and white board 316. The geometry data itself may be stored as a series of points, as shown in the example 300, or vectors or various other formats. This geometry data may also be associated with map information, for example, that may be displayed to a user in order to indicate location.

Although the geometry demonstrated in example 300 appears to be well represented, the geometry may actually comprise probabilistic models generated by using a structure from motion (SfM) technique to estimate three-dimensional geometry from two-dimensional images. In addition, there may be multiple models, or different "guesses" at the geometry of different objects.

Example Methods

In order to take advantage of the techniques described herein, the user may install an application, select a setting, and/or the like. After this, the client computing device may request the geometry data described above from a server computing device. As an example, this request may be made automatically by client computing device 120 as user 220 enters a particular geographic location, for example, when the user enters a particular building or indoor space. Alternatively, the user may download the geometry data before visiting the particular geographic location.

In response to the request, the server computing device may retrieve the geometry data from a storage system and send it to the requesting client device. For example, server computing device 110 may retrieve geometry data from storage system 150 and send the geometry data to client computing device 120.

Figure 4:
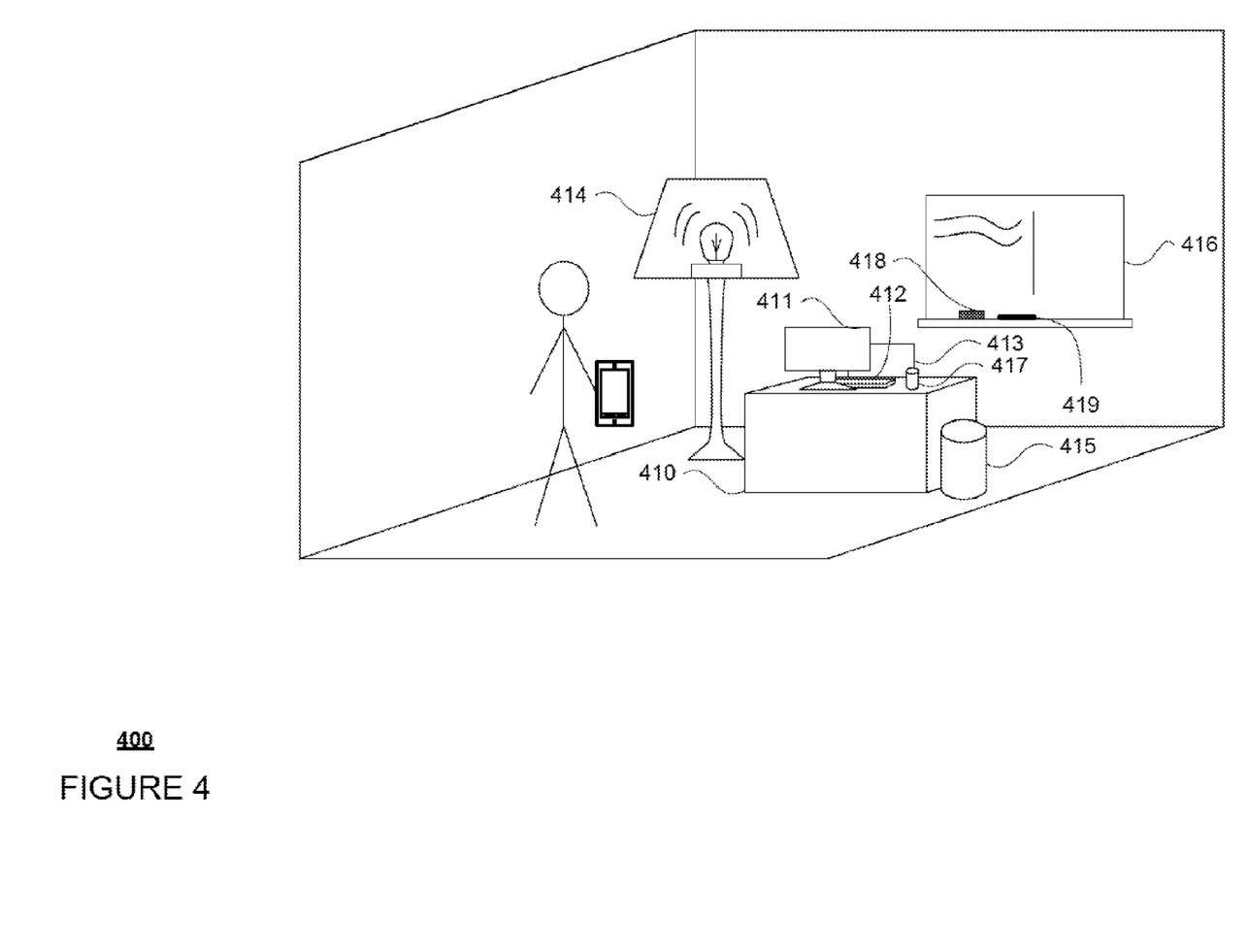
FIG. 4 is an example of a user in a room in accordance with aspects of the disclosure.

The user may then take his or her computing device to the particular geographic location. In some examples, the client computing device may be a mobile client computing device such those as described with regard to client computing devices 120, 130, and 140 such that the current location of the user's client computing device may change as the user moves the client computing device to different locations. FIG. 4 is an example of a room 400 in which user 220 is standing holding client computing device 120. Room 400 corresponds to the area of geometry data 300 and includes various objects such as desk 410, computer monitor 411, keyboard 412, chair 413, lamp 414, garbage can 415, and white board 416. In this example, there are several smaller objects such as cup 417, eraser 418, and marker 419.

Figure 5:
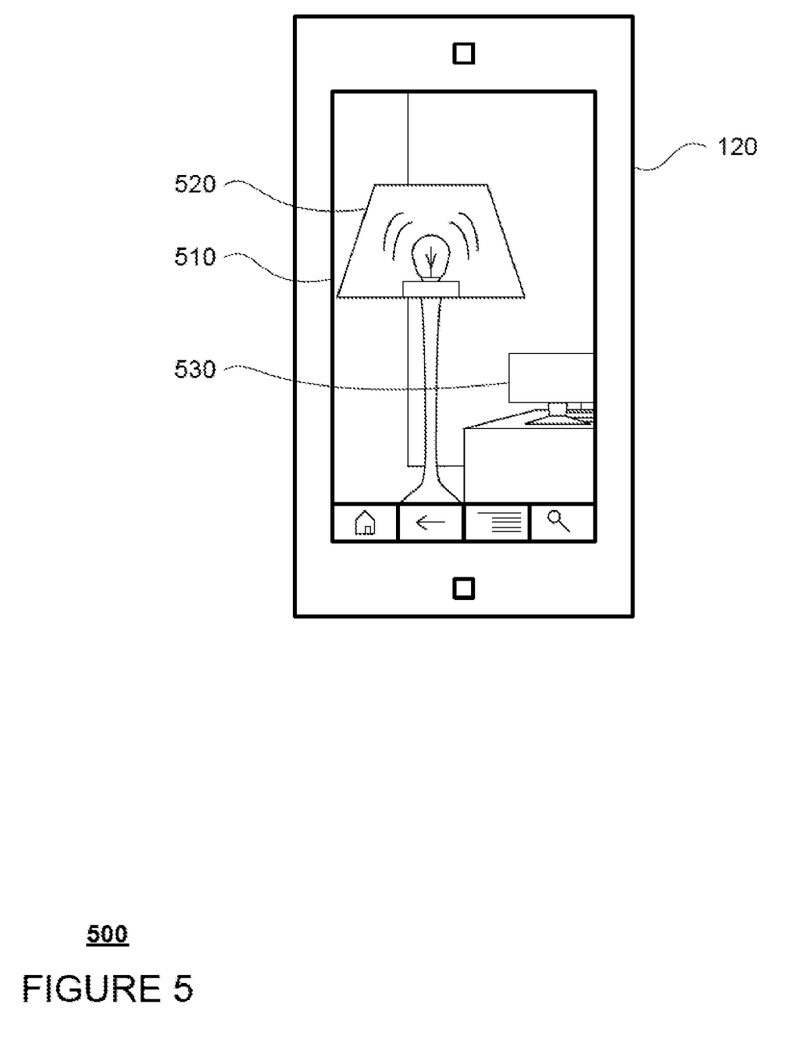
FIG. 5 is an example screen shot and client computing device in accordance with aspects of the disclosure.

The user may access the application in order to determine the current location of the user's client computing device. In response, the client computing device may prompt the user to capture an image or a video. If the user chooses to do so, he or she may move the mobile computing device around the indoor space to capture a video or a series of still images of the indoor space. Alternatively, the user may simply capture a single image of the indoor space. FIG. 5 is an example 500 of a screen shot on client device 120 of a captured image 510.

The client computing device may process one or more frames of the video or the image to identify features. The features may be extracted on the mobile computing device and/or the image or one or more video frames may be sent to one or more other computing devices in order to identify features and their relative locations. As noted above, this process may utilize an SfM technique. For example, the client computing device 120 may process image 510 in order to identify the shape of lamp 520. The client computing device 120 may also determine location of lamp 520 relative to other features in the image such as computer monitor 530.

Figure 6:
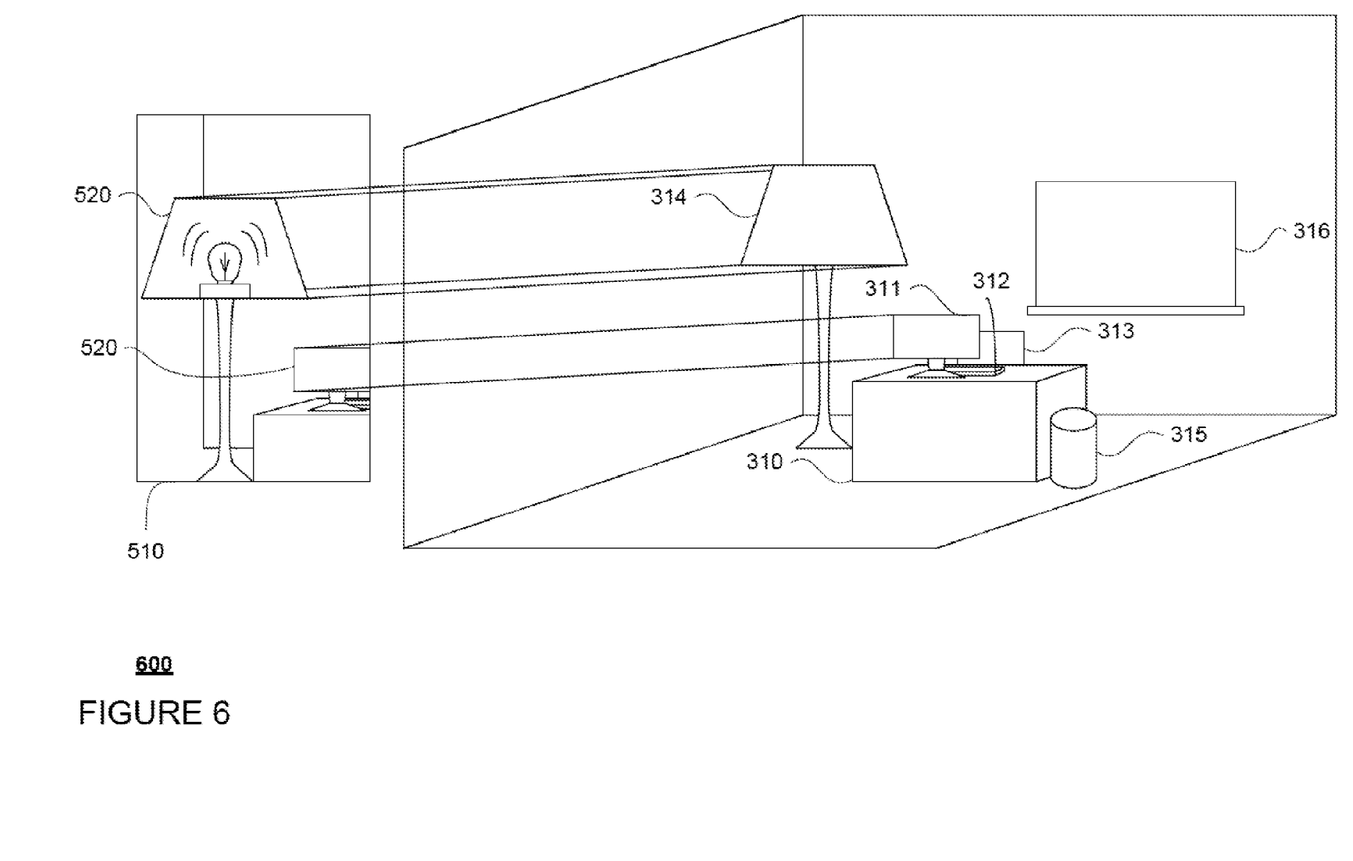
FIG. 6 is an example image and representation of geometry data in accordance with aspects of the disclosure.

The identified features may be compared to the geometry data in order to identify matching features. Again, this comparison may be achieved by using an SfM technique. For example, client computing device may access the geometry data and compare it to the identified features as shown in the example 600 of FIG. 6. In this example, geometry data 310-16 may be compared to the features identified from image 510. The client computing device may thus compare and match the lamp 520 of image 510 to the lamp 314 of geometry data 300. Similarly, the client computing device may compare and match the computer monitor 530 of image 510 to the computer monitor 311 of the geometry data 300.

Figure 7:
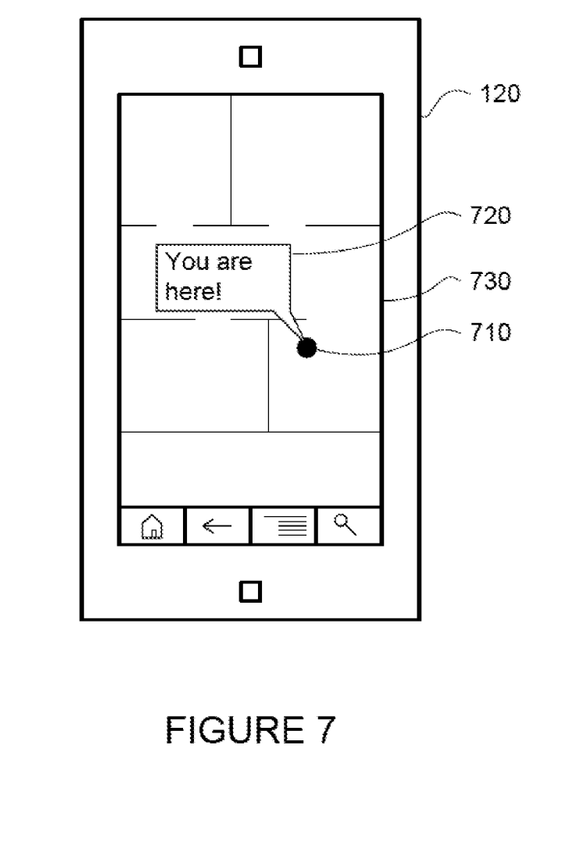
FIG. 7 is an example screen shot and client computing device in accordance with aspects of the disclosure.

Using the matched features, the client computing device may determine the location of the client computing device when the video or image was captured. For example, the client computing device may use the locations of the matched features to determine the orientation and location of the client computing device without requiring other location cues such as accelerometer or gyroscope data, GPS, WiFi, etc. In this regard, the client computing device may determine the location and orientation of the client computing device when the video or the image was captured Once the location has been determined, this information may be provided to the user. As an example, information identifying the determined location may be displayed to a user as shown in the screenshot of FIG. 7. In this example, client computing device 120 identifies a marker 710 with text bubble 720 indicating the client computing device's current location relative to a map 730.

Figure 8:
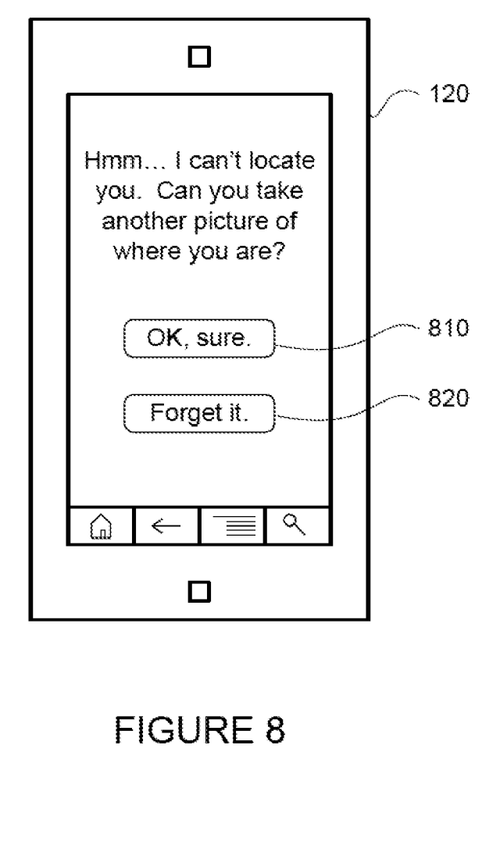
FIG. 8 is another example screen shot and client computing device in accordance with aspects of the disclosure.

In some examples, if the mobile computing device is unable to make a location determination, the device may prompt the user for assistance. As an example, the mobile computing device may ask the user to pan around the room to capture another video or to take another image. For example, FIG. 8 is a screenshot of client computing device 120 prompting the user to take another image. In this example, the user may select to take the image using option 810 or not to take the image using option 820.

The mobile computing device may also prompt the user to take an image of a unique object in that room. For example, the client computing device may prompt the user to capture an image of an object which is special or unlikely to be found in other nearby areas. As an example, if the user were standing in a conference room at a hotel, such rooms may appear somewhat similar in different locations. However, if the user captures an image of a logo unique to that location, such as a sign indicating the city or name of the hotel, a piece of art in the lobby, this sign (or art) may assist the client computing device or other computing device to determine the user's location.

Although the examples above relate to indoor spaces, the features discussed herein may also be used to find locations at outdoor spaces, such as those where GPS signals are weak, too few, or unavailable. As an example, a user may capture an image of the horizon, the skyline, etc. and request the current location as the geometry of a horizon line, sky line, etc. may be different in different locations.

Figure 9:
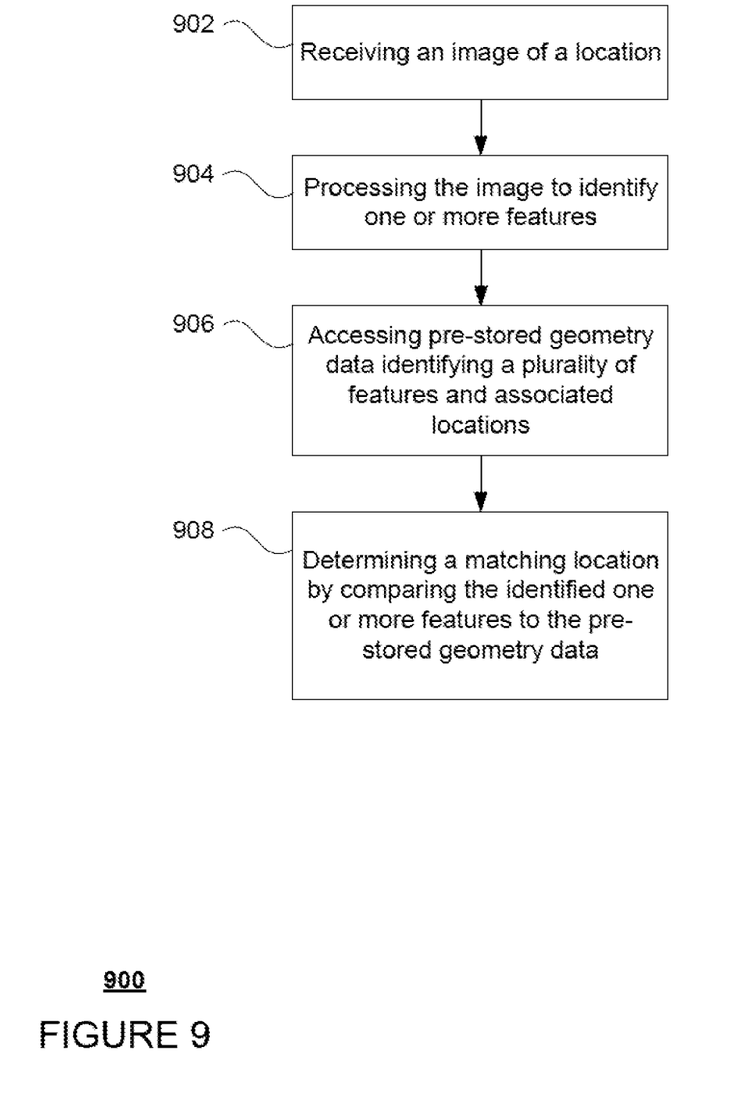
FIG. 9 is a flow diagram in accordance with aspects of the disclosure.

Flow diagram 900 of FIG. 9 is an example of some of the aspects above that may be performed by one or more computing devices such as client computing device 120, 130, 140 and/or server computing devices 110. In this example, an image of a location is received at block 902. The image is processed to identify one or more features at block 904. Pre-stored geometry data is accessed at block 906. This pre-stored geometry data identifies a plurality of features and associated locations. A matching location is determined by comparing the identified one or more features to pre-stored geometry data at block 908.

The geometry data provided to the client computing device as described above may be pre-determined. In order to do, information about the geometry of an area must be captured or recorded. In some examples, the interior of a building may be captured using lasers and/or cameras. This data may then be processed to identify the various features of the location as well as their relative locations again using a SfM technique.

The identified features may be used to generate the geometry data stored, for example, at the storage system 150. As an example, features and their associated locations may be included or excluded from the geometry data depending upon the features' value in matching and determining locations as described above. Thus, features or locations of features that are unique to a particular location within a given area may be more useful in determining and matching locations. In this regard, objects that have unique geometric shapes, arrangements of colors, or locations may be included in the geometry data. Particular groups of objects, their placement relative to one another (or other patterns of placement may also be included in the geometry data. In addition, enough features and associated locations may be included in the geometry data for a particular area in order to satisfy some minimum number of directions a camera of a client computing device is likely to be pointed in from any given location.

Returning to the examples of room 400 and example 300 of geometry data, certain features of room 400 may not be included in the geometry data. For example, smaller objects which are likely to be moved around or removed such as cup 417, eraser 418, and marker 419 are not represented in the geometry data. In another example, if there are multiple rooms in a building like room 400 that include a particular desk and particular chair, such as desk 410 and chair 413, these features may be excluded from the geometry data.

More unique features such as lamp 414 may be included in the geometry data because they are less likely to appear in other rooms or be moved to a new location. In addition, the geometry of lamp 414 may be considered unique because lamp 414 is the only lamp included in the collected data or because it is one of a small number of identical or similarly shaped or positioned lamps. For example, there may be no or very few other lamps like lamp 414 or located within x feet of a desk shaped like desk 410, or located within x feet of a door or wall, etc. Similarly, in the case of an outdoor situation the geometry and features of a set of identical buildings may be less unique, but the same building standing alone in another location may be very unique.

In one example, features and feature geometry may be ranked or valued by uniqueness. Using the examples above, the location and geometry of cup 417, eraser 418, and marker 419 may be ranked lower than the location and geometry of lamp 414. In this regard, features and their geometry may be ranked relative to one another or simply given a uniqueness value on a scale, for example, from 0-1. As an example, cup 417 may have a value of 0.01 while lamp 414 has a value of 0.89.

The highest-ranking or valued features and feature geometry may then be selected for the geometry data. In this regard, low ranking features (or those that are less unique) may be excluded from the geometry data. Again, low raking or valued features and feature geometry such as cup 417, eraser 418, and marker 419 may be excluded from the geometry data, while data for higher ranking features, such as lamp 414, may be included. The goal of this ranking is to provide useful geometry data within a wide a radius as possible for storage in limited memory of a client computing device.

Figure 10:
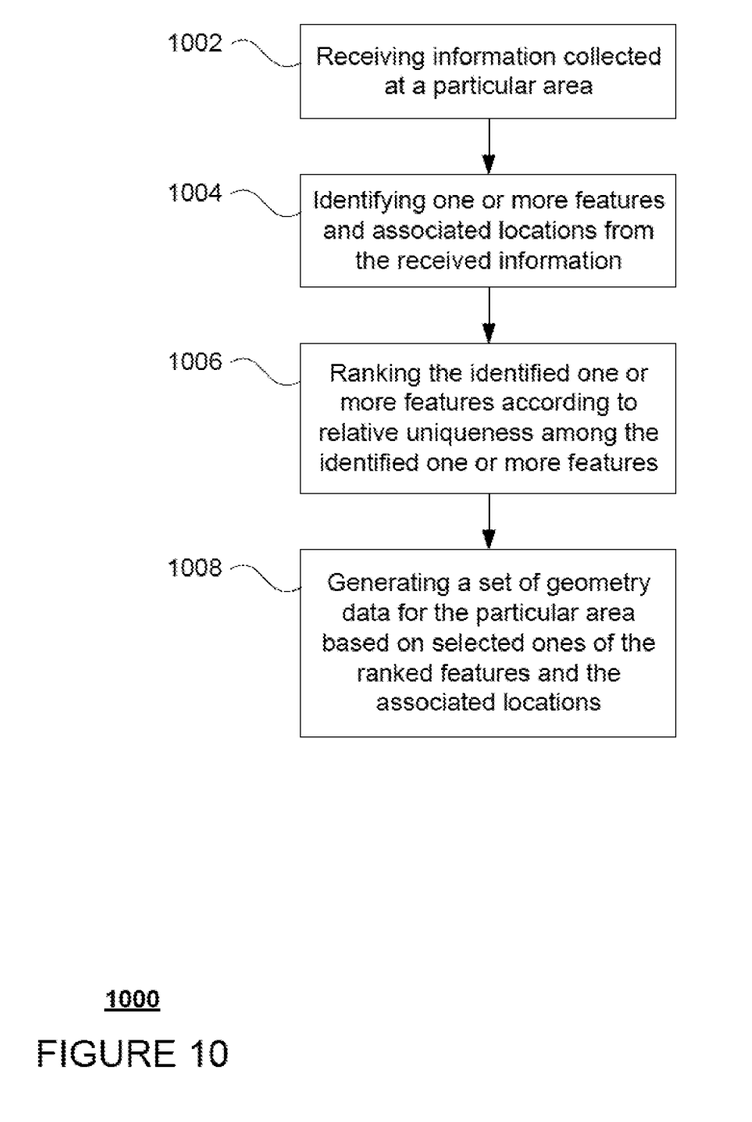
FIG. 10 is an example of a map of an indoor space in accordance with aspects of the disclosure.

Flow diagram 1000 of FIG. 10 is an example flow diagram of some of the aspects described above that may be performed by one or more computing devices such as computing devices 110. In this example, information collected at a particular area is received at block 1002. One or more features and associated locations are identified from the received information at block 1004. The identified one or more features are ranked according to relative uniqueness among the identified one or more features at block 1006. A set of geometry data is generated for the particular area based on selected one of the ranked features and the associated locations at block 1008.

Figure 11:
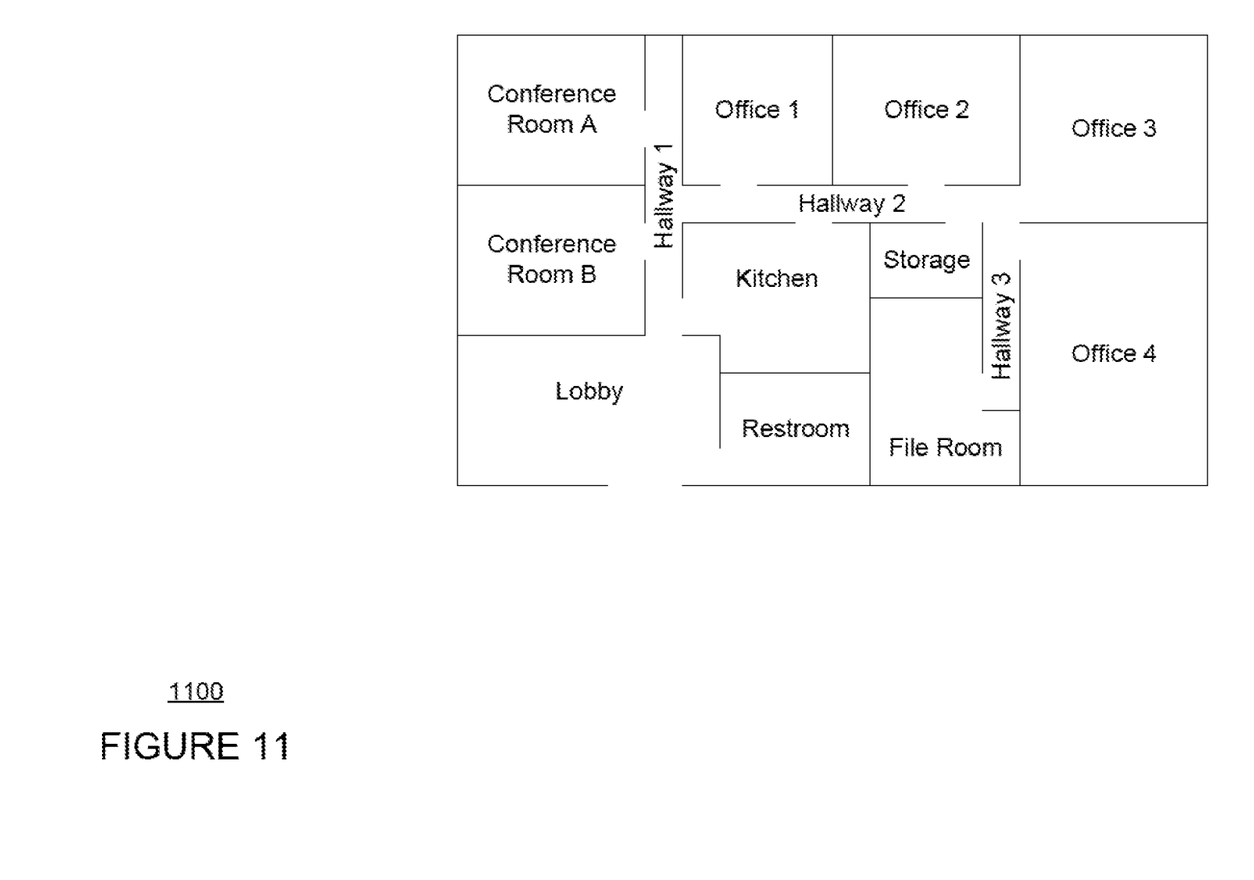
FIG. 11 is a flow diagram in accordance with aspects of the disclosure.

Features may also be included or excluded, or otherwise filtered, from the geometry data based on characteristics associated with a user. In one example, features and feature geometry may be excluded or included based on whether those features are in locations where users are likely to be or where users are likely to get lost. For example, map 1100 of FIG. 11 is an example of a floor of an office building. Features and feature data for locations such as Restroom, Hallway 1, Lobby, Conference Room A, and Conference Room B may represent areas where visiting users are likely to be located. Thus, it may be helpful to include features and feature geometry associated with this area in the geometry data. However, features and feature geometry corresponding to private areas such as Storage, File Room, and Offices 1-4 may not be include in the geometry data if visiting users are unlikely to go to these areas. Similarly, if visiting users are likely to become lost in Hallways 2 and 3, features and feature geometry associated with these areas may also be included in the feature data.

Geometry data may also be filtered based on the type of user who will need to be located. For example, as part of a registration for the application, a user may provide information about when or for what he or she expects to use the application or what hobbies or interests he or she has. If the user is a tourist, geometry related to signs or the shape of buildings may be more important, whereas if the user is an athlete (such as a runner), geometry data related to roads or vegetation (such as trees) may be more important. Returning to the example of map 1100, as noted above, geometry data designated for visiting users, tourists, etc. may include features and feature geometry for each of Hallways 1-3, Restroom, Lobby, Conference Room A, and Conference Room B. However, for someone who is an employee at the office building, the geometry data may include features and feature geometry for Hallways 1-3, Restroom, Offices 1-4, Conference Room A, and Conference Room B, but not File Room or Storage as these may still be considered private areas.

In another example, the geometry data may be determined based on the limitations of a user's client computing device. For instance, the geometry data needed for determining and matching locations may be compressed only so far. Thus, certain client computing devices which have greater bandwidth, storage, processing power, etc. may be provided with geometry data for larger areas or with more features and feature geometry. Similarly, computing devices which have lesser bandwidth, storage, processing power, etc. may be provided with geometry data for smaller areas or with less features and feature geometry. In addition display capability of the client computing device may also affect the geometry data sent to the client computing device.

Figure 12:
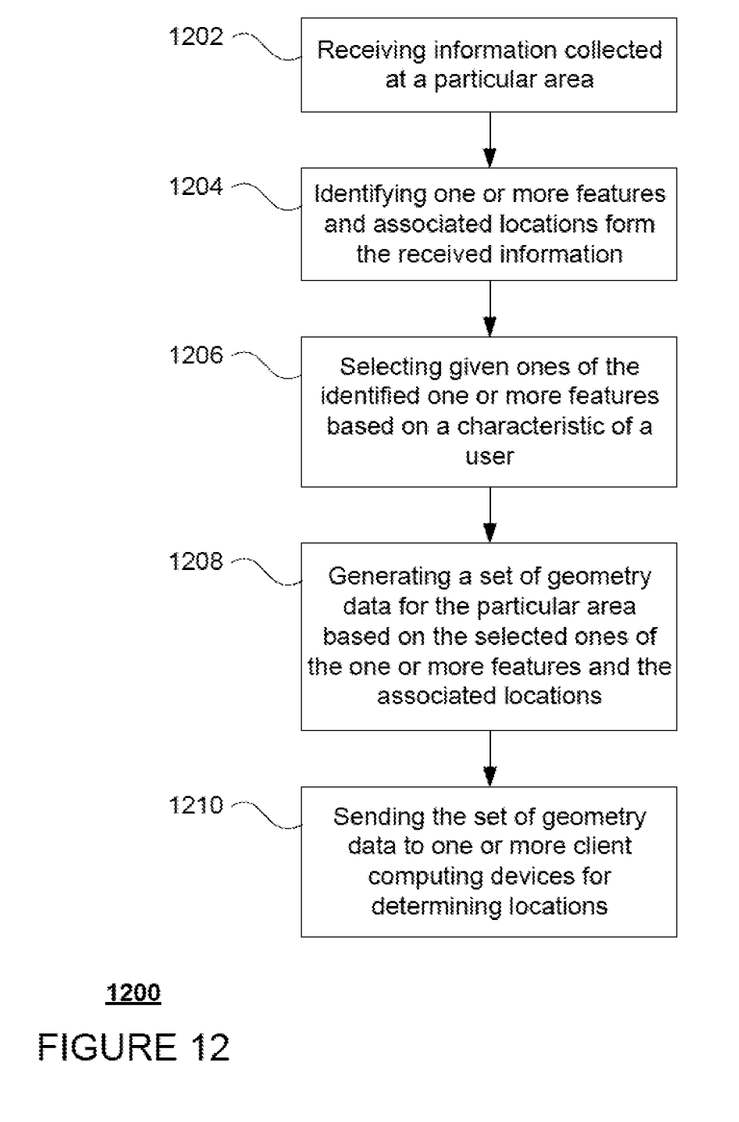
FIG. 12 is another flow diagram in accordance with aspects of the disclosure.

Flow diagram 1200 of FIG. 12 is an example flow diagram of some of the aspects described above that may be performed by one or more computing devices such as computing devices 110. In this example, information collected at a particular area is received at block 1202. One or more features and associated locations are identified from the received information at block 1204. Selecting given ones of the identified one or more features based on a characteristic of a user at block 1206. A set of geometry data is generated for the particular area based on selected one of the ranked features and the associated locations at block 1208. This geometry data may then be sent to one or more client computing devices in order to determine locations as described above at block 1210.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server, such as one or more of server computing devices 110.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
receiving, by one or more computing devices, information collected at a particular area;
identifying, by the one or more computing devices, various objects as well as the shapes of the various objects and associated locations of the various objects from the received information;
generating, by the one or more computing devices, three-dimensional geometry data for the particular area using the identified one or more features, wherein the geometry data includes a plurality of points and vectors defining the associated locations and shapes of the various objects within the particular area;
filtering, by the one or more computing devices, the three-dimensional geometry data to remove points and vectors of the three-dimensional geometry data that define at least one object of the various objects based on a characteristic identifying a first type of user in order to generate a subset of the three-dimensional geometry data for the particular area and for the first type user;
storing, by the one or more computing devices, the subset of three-dimensional geometry data for the particular area for the first type of user;
receiving, by the one or more computing devices, from a client computing device associated with a first user, user input identifying a type of the first user;
when the client computing device enters the particular area, receiving, by the one or more computing devices from the client computing device, a request for information for determining the location of the client device;
determining, by the one or more computing devices, the type of the first user as the first type of user;

retrieving, by the one or more computing devices, the stored subset of three-dimensional geometry data for the particular area and for the first type of user based on the determination; and providing in response to the request and based on the determination, by the one or more computing devices, the retrieved subset of the three-dimensional geometry data for the particular area and for the first type of user to the client computing device, wherein the three-dimensional geometry data is configured to allow the client computing device to determine a location in the particular area from an image captured by the client computing device.

2. The method of claim 1, wherein the filtering further includes removing three-dimensional geometry data corresponding to objects in locations where that user is not likely to be at the particular area.

3. The method of claim 1, wherein the filtering further includes removing three-dimensional geometry data corresponding to objects in locations where that user is likely to be lost at the particular area.

4. The method of claim 1, wherein the filtering is further based on a type of activity performed by users.

5. The method of claim 1, wherein the filtering is further based on a storage attribute of a mobile computing device.

6. The method of claim 1, wherein the filtering is further based on a processing power attribute of a mobile computing device.

7. A system comprising one or more computing devices, each of the one or more computing devices having one or more processors, the one or more computing devices being configured to:

receive information collected at an particular area;

identify various objects as well as the shapes of the various objects and associated locations of the various objects from the received information;

generate three-dimensional geometry data for the particular area using the identified one or more features, wherein the geometry data includes a plurality of points and vectors defining the associated locations and shapes of the various objects within the particular area;

filtering the three-dimensional geometry data to remove points and vectors of the three-dimensional geometry data that define at least one object of the various objects based on a characteristic identifying a first type of user in order to generate a subset of the three-dimensional geometry data for the particular area and for the first type of user;

store, by the one or more computing devices, the subset of three-dimensional geometry data for the particular area for the first type of user;

receive, by the one or more computing devices, from a client computing device associated with a first user, user input identifying a type of the first user;

when the client computing device enters the particular area, receive, from the client computing device, a request for information for determining the location of the client device;

determine the type of the first user as the first type of user;

retrieve the stored subset of three-dimensional geometry data for the particular area and for the first type of user based on the determination; and providing in response to the request and based on the determination, the retrieved subset of the three-dimensional geometry data for the particular area and for the first type of user to the client computing device, wherein the three-dimensional geometry data is configured to allow the client computing device to determine a location in the particular area from an image captured by the client computing device.

8. The system of claim 7, wherein the filtering further includes removing three-dimensional geometry data corresponding to objects in locations where that user is not likely to be at the particular area.

9. The system of claim 7, wherein the filtering further includes removing three-dimensional geometry data corresponding to objects in locations where that user is likely to be lost at the particular area.

10. The system of claim 7, wherein the filtering is further based on a type of activity performed by users.

11. The system of claim 7, wherein the filtering is further based on a storage attribute of a mobile computing device.

12. The system of claim 7, wherein the filtering is further based on a processing power attribute of a mobile computing device.

13. A non-transitory, computer-readable storage device on which computer readable instructions of a program are stored, the instructions, when executed by one or more processors, cause the one or more processors to perform a method, the method comprising:

receiving information collected at a particular area;

identifying various objects as well as the shapes of the various objects and associated locations of the various objects from the received information;

generating three-dimensional geometry data for the particular area using the identified one or more features, wherein the geometry data includes a plurality of points and vectors defining the associated locations and shapes of the various objects within the particular area;

filtering the three-dimensional geometry data to remove points and vectors of the three-dimensional geometry data that define at least one object of the various objects based on a characteristic identifying a first type of user in order to generate a subset of the three-dimensional geometry data for the particular area and for the first type user;

storing the subset of three-dimensional geometry data for the particular area for the first type of user;

receiving, from a client computing device associated with a first user, user input identifying a type of the first user;

when the client computing device enters the particular area, receiving from the client computing device, a request for information for determining the location of the client device;

determining, the type of the first user as the first type of user;

retrieving, the stored subset of three-dimensional geometry data for the particular area and for the first type of user based on the determination; and providing in response to the request and based on the determination, the retrieved subset of the three-dimensional geometry data for the particular area and for the first type of user to the client computing device, wherein the three-dimensional geometry data is configured to allow the client computing device to determine a location in the particular area from an image captured by the client computing device.

14. The medium of claim 13, wherein filtering is further based on a type of activity performed by users.

15. The medium of claim 13, wherein the filtering is further based on a storage attribute of a mobile computing device.

* * * * *